US012736623B2

(12) United States Patent
Tang et al.

(10) Patent No.: US 12,736,623 B2
(45) Date of Patent: Sep. 15, 2026

(54) MIMO SENSOR, METHOD FOR DETERMINING DIRECTION-OF-ARRIVAL APPROXIMATION DEGREE, AND TARGET INFORMATION MATCHING METHOD

(71) Applicant: CALTERAH SEMICONDUCTOR TECHNOLOGY (SHANGHAI) CO., LTD., Shanghai (CN)

(72) Inventors: Ran Tang, Shanghai (CN); Yanqun Zhang, Shanghai (CN); Yan Zhu, Shanghai (CN)

(73) Assignee: Calterah Semiconductor Technology (Shanghai) Co., Ltd., Shanghai (CN)

( * ) Notice: Subject to any disclaimer, the term of this patent is extended or adjusted under 35 U.S.C. 154(b) by 263 days.

(21) Appl. No.: 18/401,279

(22) Filed: Dec. 29, 2023

(65) Prior Publication Data

US 2024/0134006 A1 Apr. 25, 2024
US 2024/0230840 A9 Jul. 11, 2024

Related U.S. Application Data

(63) Continuation of application No. PCT/CN2023/071151, filed on Jan. 8, 2023.

(30) Foreign Application Priority Data

May 20, 2022 (CN) ......................... 202210555397.5

(51) Int. Cl.
*G01N 22/02* (2006.01)
*G01S 3/46* (2006.01)
(Continued)

(52) U.S. Cl.
CPC ................ *G01S 7/412* (2013.01); *G01S 3/46* (2013.01); *G01S 13/582* (2013.01)

(58) Field of Classification Search
CPC ........... G01S 7/412; G01S 3/46; G01S 13/582
See application file for complete search history.

(56) References Cited

U.S. PATENT DOCUMENTS 6,100,845 A 8/2000 Rose
2016/0189002 A1 6/2016 Kawakami et al.
(Continued)

FOREIGN PATENT DOCUMENTS

CN 107810426 A 3/2018
CN 110646773 A 1/2020
(Continued)

OTHER PUBLICATIONS

Calterah Semiconductor Technology (shanghai) Co.,Ltd., International Search Report with English translation, PCT/CN2023/071151, Jun. 10, 2023, 7 pgs.
(Continued)

*Primary Examiner* — Nazra Nur Waheed
(74) *Attorney, Agent, or Firm* — USCH Law, PC

(57) ABSTRACT

The embodiments of the present disclosure relate to the technical field of signal processing. Disclosed are a MIMO sensor, a method for determining a direction-of-arrival approximation degree, and a target information matching method. The method for determining the direction-of-arrival approximation degree includes: respectively obtaining receiving vectors of a first target and a second target according to a processing result of a multi-channel echo signal, calculating a correlation coefficient between the receiving vectors of the first target and the second target, and determining a direction-of-arrival approximation degree between the first target and the second target according to the correlation coefficient. By using the method for deter-
(Continued)

mining the direction-of-arrival approximation degree, the real-time performance of multi-channel echo signal processing can be improved.

17 Claims, 4 Drawing Sheets

(51) Int. Cl.
*G01S 7/41* (2006.01)
*G01S 13/58* (2006.01)

(56) References Cited

U.S. PATENT DOCUMENTS

| | | | | |
|---|---|---|---|---|
| 2019/0064339 | A1 | 2/2019 | Kuo et al. | |
| 2020/0096595 | A1* | 3/2020 | Kishigami | G01S 7/295 |
| 2020/0150256 | A1* | 5/2020 | Dent | G01S 13/42 |
| 2020/0326408 | A1 | 10/2020 | Bialer et al. | |
| 2021/0293927 | A1* | 9/2021 | Tyagi | G01S 7/412 |
| 2022/0003835 | A1* | 1/2022 | Iwasa | G01S 13/288 |
| 2023/0152435 | A1* | 5/2023 | Koppelaar | G06F 17/156 342/147 |
| 2023/0375690 | A1* | 11/2023 | Arkind | G01S 13/42 |

FOREIGN PATENT DOCUMENTS

| | | | |
|---|---|---|---|
| CN | 113009448 | A | 6/2021 |
| CN | 113625265 | A | 11/2021 |
| CN | 113759362 | A | 12/2021 |
| CN | 114428236 | A | 5/2022 |
| CN | 114966595 | A | 8/2022 |
| KR | 20120089020 | A | 8/2012 |

OTHER PUBLICATIONS

Ziwei Liu et al., “Clustering Method to Discriminate Active False Targets in Multistatic Radar System”, Journal of Electronics & Information Technology, vol. 43 No. 11, Nov. 30, 2021, p. 3211-3219, 9 pgs.

Calterah Semiconductor Technology (Shanghai) Co., Ltd., Chinese First Office Action with English Translation, CN 202210555397.5, Mar. 27, 2025, 18 pgs.

Xiang et al: “Robust adaptive beamforming for MIMO radar”, Signal Processing, vol. 90, No. 12, May 28, 2010, pp. 3185-3196, 12 pgs.

Calterah Semiconductor Technology (Shanghai) Co., Ltd., European Search Report, EP 23715408.3, Jul. 16, 2025, 8 pgs.

* cited by examiner

Frame A

Frame B

MIMO SENSOR, METHOD FOR DETERMINING DIRECTION-OF-ARRIVAL APPROXIMATION DEGREE, AND TARGET INFORMATION MATCHING METHOD

CROSS REFERENCE TO RELATED APPLICATIONS

This application is a continuation of PCT Patent Application No. PCT/CN2023/071151, filed Jan. 8, 2023, which claims priority to Chinese Patent Application No. 202210555397.5, entitled "MIMO SENSOR, METHOD FOR DETERMINING DIRECTION-OF-ARRIVAL APPROXIMATION DEGREE, AND TARGET INFORMATION MATCHING METHOD," filed on May 20, 2022, each of which is incorporated by reference herein in its entirety.

TECHNICAL FIELD

The various embodiments described in this document relate in general to the technical field of signal processing, and more specifically to a MIMO sensor, a method for determining a direction-of-arrival approximation degree, and a target information matching method.

BACKGROUND

A MIMO (Multiple Input Multiple Output) sensor based on the principle of radar has broad application prospects in the field of autonomous driving. For example, the MIMO sensor is installed on a vehicle to detect target information of an actual object such as an obstacle in the environment. In the MIMO sensor, a series of continuous pulse signals are transmitted via a transmitter antenna, and echoes of the pulse signals are received via a receiver antenna and are processed to output the detected target information. This process is generally referred to as a frame in time. The radar detects moving or stationary objects around in real time by receiving continuous frames of echo signals and performing corresponding signal processing. The target information obtained by the MIMO sensor includes a range, radial velocity, azimuth, height and other information of the actual object relative to the transmitter antenna.

In multi-channel echo signal processing, the process of determining whether two target information in the same frame or adjacent frames correspond to the same actual object for object distinction, or determining whether two target information in adjacent frames correspond to the same actual object for object tracking, is called target information matching. The target information matching may be achieved by measuring the proximity of information parameters (e.g., range, velocity, direction of arrival (DOA), etc.) of two targets. When the information parameters of the two targets are very close, that is, the matching is successful, it is considered that the target information corresponds to the same actual object. In addition, in some other radar applications, for example, by setting the pulse repetition frequency (PRF) of adjacent frames to be different and then matching the target information, the velocity measurement of high-velocity targets can be realized.

A common process of target information matching includes: calculating intra-frame correlation of multi-channel echo signals to obtain information parameters of targets, and then comparing the information parameters within the same frame or between adjacent frames to determine whether two targets correspond to the same actual object.

For example, direction-of-arrival approximation degree determination and target information matching may be performed based on the comparison results of directions of arrival of two targets. However, in order to obtain the direction of arrival of the target, the signal processing of the multi-channel echo signals has to perform multiple digital beam forming (DBF) operations related to a scanning angle. Therefore, the signal processing process in the above target information matching process is relatively complicated, and the correlation calculation takes too long, which deteriorates real-time performance of multi-channel echo signal processing.

SUMMARY

In view of the above problems, embodiments of the present disclosure are intended to provide a MIMO sensor, a method for determining a direction-of-arrival approximation degree, and a target information matching method, so as to determine whether two targets correspond to a same actual object by correlation calculation of receiving vectors of the two targets, and further to improve the real-time performance of multi-channel echo signal processing.

Some embodiments of the present disclosure provide a method for determining a direction-of-arrival approximation degree between targets, which may be applied to a MIMO sensor, and the method includes:

- obtaining receiving vectors of a first target and a second target respectively according to a processing result of a multi-channel echo signal;
- calculating a correlation coefficient between the receiving vectors of the first target and the second target; and
- determining a direction-of-arrival approximation degree between the first target and the second target according to the correlation coefficient.

In the above method, through the correlation coefficient between the receiving vectors of the targets, the direction-of-arrival approximation degree between the first target and the second target may be determined without obtaining numerical values of the directions of arrival of the first target and the second target, thus improving the real-time performance of multi-channel (at least two transceiver channels) echo signal processing.

Alternatively, the receiving vectors may include range information and velocity information, such as range vector and velocity vector, that is, the above correlation coefficient may be obtained based on the range and velocity information without direction-of-arrival information.

Alternatively, calculating the correlation coefficient between the receiving vectors of the first target and the second target may include:

- performing, for example, a conjugate correlation processing on the receiving vectors of the first target and the second target to obtain the correlation coefficient;
- where a value of the correlation coefficient is positively correlated with the direction-of-arrival approximation degree between the first target and the second target.

Alternatively, the first target and the second target are different targets detected in the same frame of the multi-channel echo signal, so as to determine the direction-of-arrival approximation degree between two actual objects (targets) at the same moment (i.e. within one frame period).

Alternatively, the first target and the second target are same or different targets detected in continuous frames of the multi-channel echo signal.

Some embodiments of the present disclosure further provide a target information matching method, which may be applied to a MIMO sensor, and the method may include:

receiving continuous frames of multi-channel echo signals;

obtaining receiving vectors of a first target and a second target respectively in adjacent frames of the continuous frames according to a processing result of the multi-channel echo signals;

calculating a correlation coefficient between the receiving vectors of the first target and the second target; and determining whether the first target and the second target match a same actual object according to the correlation coefficient.

According to the target information matching method, whether two targets in adjacent frames are matched to the same actual object (target) may be quickly determined by calculating the receiving vectors, thus realizing fast matching of target information output by two frames.

Alternatively, the receiving vectors may include range information and velocity information, that is, the fast matching of the direction of arrival of the target information output by two frames may be realized based on the receiving vector containing range and velocity information, so that the operation of calculating and obtaining the direction of arrival of each target is unnecessary, thus greatly improving timeliness and saving signal data processing resources.

Alternatively, calculating the correlation coefficient between the receiving vectors of the first target and the second target includes:

performing, for example, a conjugate correlation processing on the receiving vectors of the first target and the second target to obtain the correlation coefficient;

where a value of the correlation coefficient is positively correlated with the direction-of-arrival approximation degree between the first target and the second target.

Alternatively, the adjacent frames include a first frame and a second frame, and the first target and the second target are targets detected in the first frame and the second frame, respectively.

Alternatively, obtaining the receiving vectors of the first target and the second target respectively in the adjacent frames of the continuous frames includes:

performing signal processing on the multi-channel echo signals of the adjacent frames respectively to obtain multi-channel range-Doppler two-dimensional data of the first frame and the second frame;

detecting the first target by searching for a peak in the multi-channel range-Doppler two-dimensional data of the first frame; and detecting the second target by searching for a peak in multi-channel range-Doppler two-dimensional data of the second frame.

Alternatively, the first target corresponds to a first set of range-Doppler units in the multi-channel range-Doppler two-dimensional data of the first frame, and the second target corresponds to a second set of range-Doppler units in the multi-channel range-Doppler two-dimensional data of the second frame, a coordinate parameter of each unit in the first set of range-Doppler units and the second set of range-Doppler units in corresponding range-Doppler two-dimensional data includes range information and velocity information.

Alternatively, the receiving vector of the first target includes a first set of elements, the first set of elements respectively representing complex number values of the first set of range-Doppler units at corresponding coordinates on a range-Doppler two-dimensional complex plane, and the receiving vector of the second target includes a second set of elements, the second set of elements respectively representing complex number values of the second set of range-Doppler units at corresponding coordinates on the range-Doppler two-dimensional complex plane.

Alternatively, the correlation coefficient between the receiving vectors of the first target and the second target may be calculated by using the following formula:

$$corr\_coe = |RV\_VEC\_A * (RV\_VEC\_B)H| / (|RV\_VEC\_A| * |RV\_VEC\_B|)$$

where RV_VEC_A represents the receiving vector of the first target TA, RV_VEC_B represents the receiving vector of the second target TB, H represents conjugate and transpose, / represents division, and || represents calculating vector modulus.

Alternatively, in response to the correlation coefficient being greater than a predetermined value, it is determined that the first target and the second target match the same actual object.

Alternatively, in response to the correlation coefficient being less than or equal to a predetermined value, it is determined that the first target and the second target do not match the same actual object, and a method for determining a direction-of-arrival approximation degree traverses a plurality of targets detected in the continuous frames to obtain the first target and the second target that match the same actual object.

Some embodiments of the present disclosure further provide a MIMO sensor, which may include:

a plurality of transceiver channels, configured to receive a multi-channel echo signal; and a signal processing unit, configured to perform a signal processing on the multi-channel echo signal, and obtain receiving vectors of a first target and a second target respectively according to a processing result of the signal processing, where the signal processing unit is further configured to calculate a correlation coefficient between the receiving vectors of the first target and the second target; and to determine a direction-of-arrival approximation degree between the first target and the second target according to the correlation coefficient.

Alternatively, the receiving vectors may include range information and velocity information.

Alternatively, calculating the correlation coefficient between the receiving vectors of the first target and the second target includes:

performing a conjugate correlation processing on the receiving vectors of the first target and the second target to obtain the correlation coefficient;

where a value of the correlation coefficient is positively correlated with the direction-of-arrival approximation degree between the first target and the second target.

Alternatively, the plurality of transceiver channels include:

a plurality of antennas including a combination of at least one transmitter antenna and a plurality of receiver antennas, or a combination of a plurality of transmitter antennas and at least one receiver antenna;

a transmitter unit connected with the at least one transmitter antenna or the plurality of transmitter antennas among the plurality of antennas to provide at least one transmitter channel; and a receiver unit connected with the at least one receiver antenna or the plurality of receiver antennas among the plurality of antennas to provide at least one receiver channel, where a total number of the at least one transmitter channel and the at least one receiver channel is greater than or equal to 3.

Alternatively, the MIMO sensor may further include:

a control unit connected with the transmitter unit and the receiver unit, the control unit be configured to control the transmitter unit to generate a transmitting signal to be converted into a radar beam via the at least one transmitter antenna or the plurality of transmitter antennas among the plurality of antennas, and to control the receiver unit to obtain a multi-channel echo signal via the at least one receiver antenna or the plurality of receiver antennas among the plurality of antennas.

Alternatively, the first target and the second target are same or different targets detected in continuous frames of the multi-channel echo signal.

Alternatively, the signal processing unit is further configured to obtain the receiving vectors of the first target and the second target respectively in adjacent frames of the continuous frames.

Alternatively, the signal processing unit is further configured to determine whether the first target and the second target match a same actual object according to the correlation coefficient.

According to the method for determining the direction-of-arrival approximation degree and the target information matching method provided by the embodiments of the present disclosure, the correlation coefficient is directly calculated according to the receiving vectors of the two targets, and the matching degree of direction of arrival of the two targets is evaluated according to the magnitude of the correlation coefficient. The value of the correlation coefficient is positively correlated with the direction-of-arrival approximation degree between the first target and the second target, that is, the larger the correlation coefficient, the higher the matching degree of the direction of arrival. Therefore, in the method for determining the direction-of-arrival approximation degree and the target information matching method, the complex calculation process of digital beam forming can be simplified without actually calculating the direction of arrival of the target. In particular, since there is no need to perform a vector inner product operation between the receiving vector and a steering vector, multiple digital beam forming (DBF) operations related to the scanning angle of the radar beam can be significantly reduced. Assuming that the scanning angle of the digital beam forming ranges from −60 degrees to 60 degrees, with an interval of 1 degree, and by using the target information matching method in related technology, the calculation of direction of arrival of each target requires 120 correlation calculations, and the comparison of directions of arrival of two targets requires 240 correlation calculations. However, by using the target information matching method in the embodiments of the present disclosure, the calculation of the correlation coefficient of the receiving vectors of two targets requires only 1 correlation calculation.

Therefore, the signal processing process of the method for determining the direction-of-arrival approximation degree and the target information matching method according to the embodiments of the present disclosure simplifies complexity of correlation calculation, significantly shortens the time consumption, and can significantly improve the real-time performance of the multi-channel echo signal processing.

BRIEF DESCRIPTION OF THE DRAWINGS

The above and other objectives, features and advantages of the present disclosure will be clearer through the following description of embodiments of the present disclosure with reference to the accompanying drawings.

DETAILED DESCRIPTION OF THE EMBODIMENTS

Figure 1:
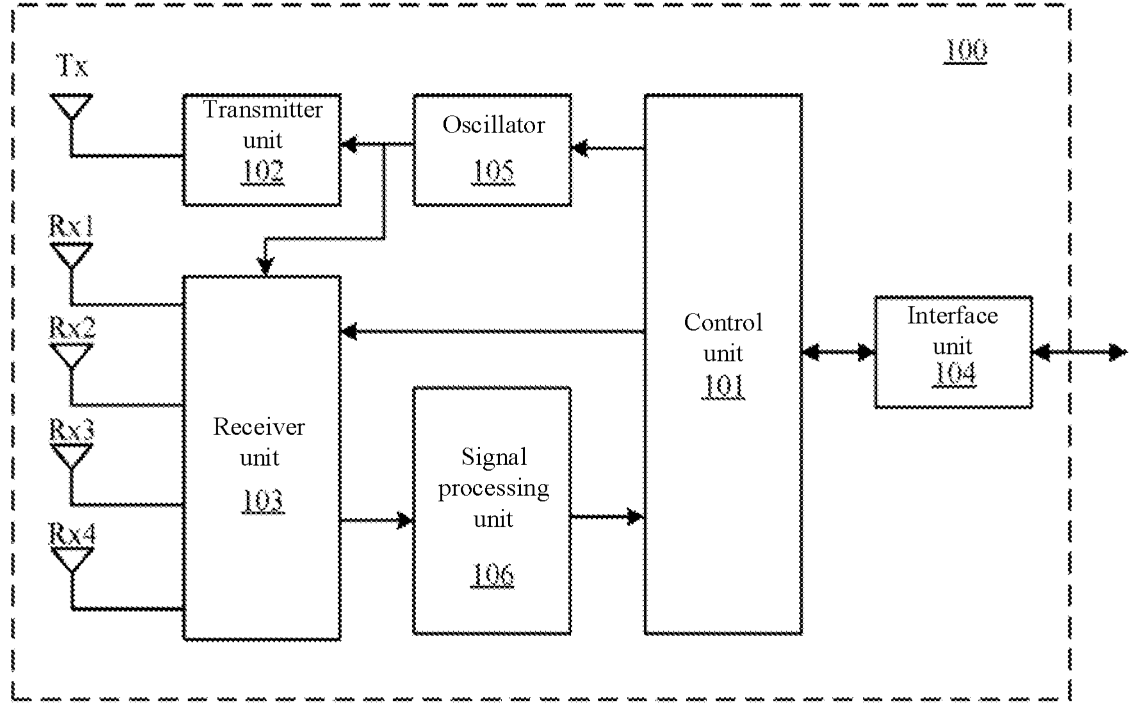
FIG. 1 shows a schematic structural diagram of a MIMO sensor.

The present disclosure will be described in more detail below with reference to the accompanying drawings. In each of the accompanying drawings, identical components are indicated with similar reference numerals. For the sake of clarity, various parts in the drawings are not drawn to scale. Furthermore, some well-known parts may not be shown in the drawings.

FIG. 1 shows a schematic structural diagram of a MIMO sensor. The MIMO sensor 100 is, for example, installed on a vehicle to detect target information of an actual object such as an obstacle in the environment.

The MIMO sensor 100 includes a control unit 101, a transmitter unit 102, a receiver unit 103, an interface unit 104, an oscillator 105, a signal processing unit 106, a transmitter antenna Tx, and receiver antennas Rx1 to Rx4. The transmitter unit 102 is connected to the transmitter antenna Tx for providing a transmitting signal. The receiver unit 103 is connected to a plurality of receiver antennas Rx1 to Rx4 for obtaining an echo signal.

The oscillator 105 is configured to generate a radio frequency signal. The oscillator 105 is, for example, a phase-locked loop including a phase detector, a low-pass filter and a voltage-controlled oscillator. The phase detector is configured to detect a phase difference between an input signal and an output signal to generate a control voltage, and the voltage-controlled oscillator is configured to adjust a frequency according to the control voltage, so that the phase-locked loop may provide a radio frequency signal with the same input signal and output signal. The oscillator 105 is configured to provide the radio frequency signal to the transmitter unit 102 and the receiver unit 103.

The transmitter unit 102 is connected to the transmitter antenna Tx to form a transmitter channel. The transmitter unit 102 amplifies the power of the radio frequency signal provided by the oscillator 105 to obtain a transmitting signal, and provides the transmitting signal to the transmitter antenna Tx. The function of the transmitter antenna Tx is to convert a waveguide field and a space radiation field, and to convert the transmitting signal into a radar beam radiated to the surrounding environment.

The receiver unit 103 is connected to the plurality of receiver antennas Rx1 to Rx4 to form a plurality of receiver channels. In the case of obstacles in the surrounding environment, the receiver antennas Rx1 to Rx4 may receive an echo of the radar beam, and the function of the receiver antennas Rx1 to Rx4 is to convert the space radiation field into the waveguide field, so as to obtain an echo signal of the echo. The receiver unit 103 mixes echo signals of the plurality of receiver channels with the radio frequency signal provided by the oscillator 105 to generate a primary analog signal, and converts the primary analog signal into an analog input signal.

The control unit 101 is connected with the transmitter unit 102 and the receiver unit 103. The control unit 101 is configured to control the transmitter unit 102 to generate the transmitting signal to be converted into the radar beam via the transmitter antenna Tx, and to control the receiver unit 103 to obtain a multi-channel echo signal via the receiver antennas Rx1 to Rx4.

The interface unit 104 is connected with the control unit 101 for providing a communication interface between the control unit 101 and an external device. In the case of autonomous driving, the external device is, for example, a vehicle controller. The control unit 101 transmits result data to the external device via the interface unit 104. Therefore, the external device may control a vehicle operation according to the result data of the MIMO sensor, for example, to realize such functions as obstacle avoidance.

The signal processing unit 106 samples the analog input signal to obtain a digital signal, and performs a first digital signal processing process on the digital signal to obtain intermediate data.

The control unit 101 may include an analog-to-digital converter and a radar processor. Herein, the analog-to-digital converter is configured for sampling the analog input signal according to a sampling clock signal so as to obtain the corresponding digital signal. The radar processor includes a plurality of processing units and a storage unit for storing intermediate data and/or result data. The plurality of processing units of the radar processor may be used to perform at least some of the following data processing processes: Fourier transformation, target detection, angle detection and point cloud imaging, where the Fourier transformation may include one-dimensional Fast Fourier Transformation (1D-FFT) and two-dimensional Fast Fourier Transformation (2D-FFT). The signal processing unit 106 performs signal processing and data processing on the echo signal, and may obtain result data such as range, velocity, and direction of arrival (DOA) of the target.

In the signal processing process that the signal processing unit 106 obtains the result data of the target according to the echo signal, the range and velocity information may generally be directly extracted from range-Doppler two-dimensional data processed from the multi-channel echo signal, while acquisition of the direction of arrival information generally requires a relatively complicated processing process like digital beam forming (DBF). A plurality of transceiver channels are required to measure the direction of arrival of the target using digital beam forming, as shown in FIG. 1. By performing the signal processing on the echo signal of each receiver channel, range-Doppler two-dimensional data may be obtained, and each target corresponds to a range-Doppler unit. Data of range-Doppler units of all the receiver channels corresponding to the same target are combined into a receiving vector, and the receiving vector and a set of steering vectors are used for a correlation calculation, that is, vector inner product operation, to obtain a correlation spectrum. This process is digital beam forming. The angle corresponding to a peak of the correlation spectrum is an azimuth angle of the target relative to the radar, that is, the direction of arrival.

In FIG. 1, the plurality of transceiver channels of the illustrated MIMO sensor include one transmitter channel and a plurality of receiver channels. However, the plurality of transceiver channels of the MIMO sensor may also include a plurality of transmitter channels and one receiver channel. In this case, the transmitter unit 102 may be connected to a plurality of transmitter antennas to form at least one transmitter channel, and the receiver unit 103 may be connected to one receiver antenna to form at least one receiver channel. It should be understood that the plurality of transceiver channels of the MIMO sensor are not limited thereto, as long as a total number of transmitter channels and receiver channels is greater than or equal to 3, that is, the number of the transceiver channels of the MIMO sensor is greater than or equal to 2. For example, when the number of the transceiver channels of the MIMO sensor is equal to 2, the MIMO sensor may have one transmitter channel (transmitter antenna) and two receiver channels (receiver antennas); or, two transmitter channels (transmitter antenna) and one receiver channel (receiver antenna).

Figure 2:
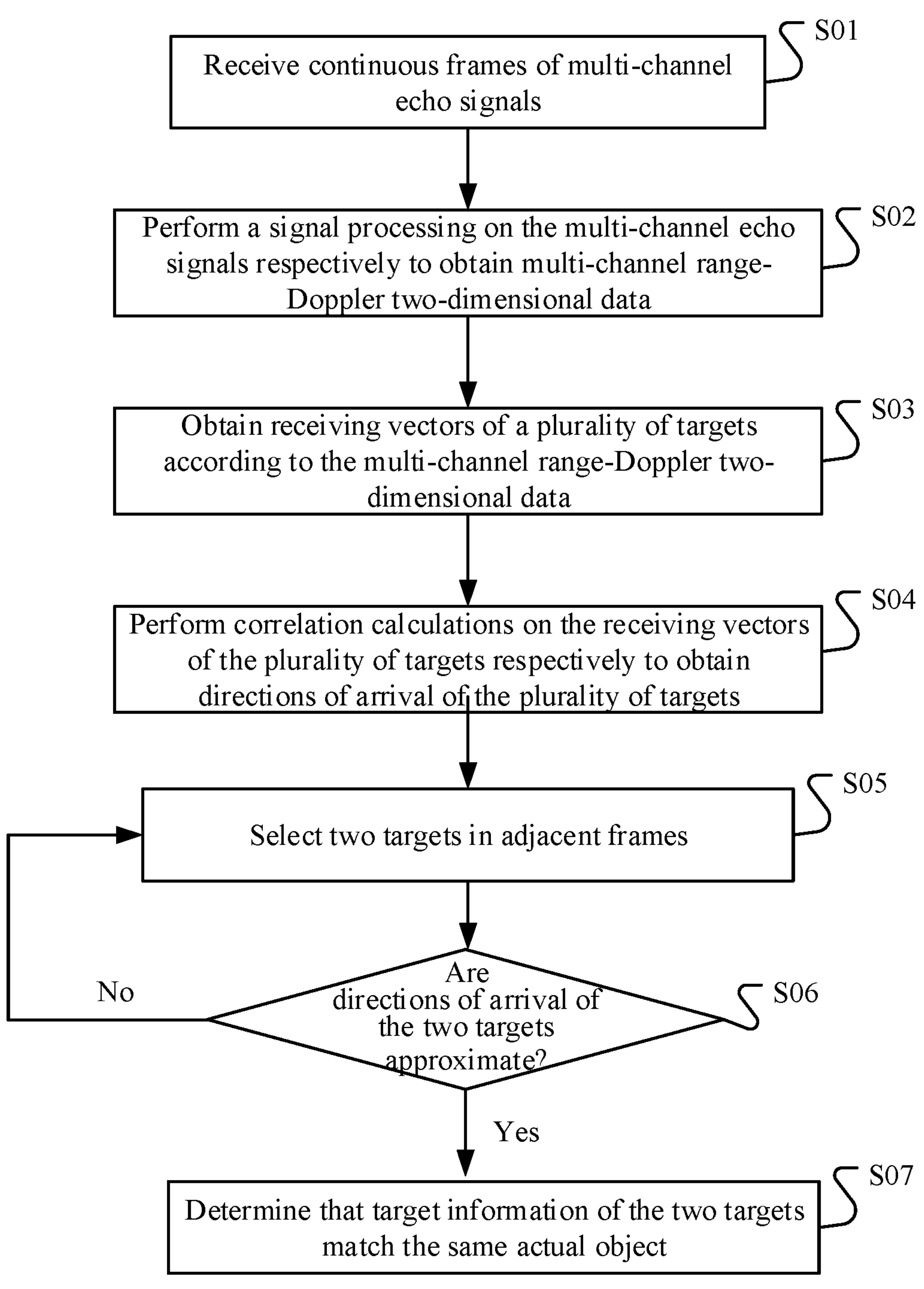
FIG. 2 shows a flowchart of a conventional target information matching method.

FIG. 2 shows a flowchart of a conventional target information matching method. The target matching method performs target information matching based on a comparison result of directions of arrival of two targets in continuous frames. For example, the signal processing unit in the MIMO sensor shown in FIG. 1 may execute the target information matching method described in operations S01 to S07 below.

In S01, continuous frames of multi-channel echo signals are received.

During the frame period of the multi-channel echo signal, the MIMO sensor transmits the radar beam to the surrounding environment via the transmitter antenna Tx, and then receives the echo signal of the radar beam via the receiver antennas Rx1 to Rx4. The receiver unit is connected with a plurality of receiver antennas Rx1 to Rx4 to form a plurality of transceiver channels, and performs signal processing on echo signals received by different antennas respectively. In each frame period, the MIMO sensor may receive multi-channel echo signals via the plurality of receiver antennas. In a continuous-frame period, the MIMO sensor may obtain continuous frames of multi-channel echo signals.

In S02, a signal processing is performed on the multi-channel echo signals respectively to obtain multi-channel range-Doppler two-dimensional data.

The signal processing of the echo signal includes analog signal processing and digital signal processing. The analog signal processing includes mixing and converting the echo signal to obtain an analog input signal. The digital signal processing includes converting the analog input signal into a digital signal and performing multiple data processing processes: Fourier transformation, target detection, angle detection and point cloud imaging. Herein, the Fourier transformation may include one-dimensional Fast Fourier Transformation (1D-FFT) and two-dimensional Fast Fourier Transformation (2D-FFT). The one-dimensional Fast Fourier Transformation (1D-FFT) includes, for example, a range-dimensional Fourier transformation and a velocity-dimensional Fourier transformation, through which range-dimensional data and velocity-dimensional data may be obtained respectively. The two-dimensional Fast Fourier Transformation (2D-FFT) includes, for example, the range-dimensional Fourier transformation and a Doppler-dimensional Fourier transformation performed successively, through which range-Doppler two-dimensional data may be obtained.

In S02, the above signal processing is performed on the continuous frames of the multi-channel echo signals of the MIMO sensor, and multi-channel range-Doppler two-dimensional data may respectively be obtained for each frame of the echo signals.

In S03, receiving vectors of a plurality of targets are obtained according to the multi-channel range-Doppler two-dimensional data.

In the range-Doppler two-dimensional data of each channel, a peak is searched for in a range-Doppler 2D complex plane to detect the target. The range and velocity information of the target are obtained from the range and velocity coordinates (r, v) of the range-Doppler unit, respectively. Therefore, for example, a plurality of range-Doppler units are detected in the range-Doppler two-dimensional data of each channel, and each range-Doppler unit corresponds to a target, and the range-Doppler unit has corresponding target information, that is, the range and velocity information of the target.

The range-Doppler units in the multi-channel range-Doppler two-dimensional data form the receiving vector of the same target according to the corresponding relationship with the same target.

In this operation, based on the multi-channel range-Doppler two-dimensional data of one frame, the receiving vector RV_VEC of the detected target in the frame is obtained, as shown in formula (1):

$$RV\_VEC=[RV\_DAT1(r,v),RV\_DAT2(r,v),RV\_DAT3(r,v),RV\_DAT4(r,v)] \tag{1}$$

where RV_DAT1(r, v), RV_DAT2(r, v), RV_DAT3(r, v) and RV_DAT4(r, v) are a set of elements of the receiving vector, which respectively represent the complex number values of the detection target at the coordinates (r, v) on the range-Doppler two-dimensional complex plane of the multi-channel range-Doppler data.

In S04, correlation calculations are performed on the receiving vectors of the plurality of targets respectively to obtain directions of arrival of the plurality of targets.

In this operation, a correlation calculation is performed on the receiving vector of the detection target and a steering vector, that is, vector inner product operation, to obtain a correlation spectrum. The angle corresponding to the peak is obtained on the correlation spectrum, which is the direction of arrival of the detection target.

In operations S05 to S07, two targets with approximate directions of arrival in adjacent frames are matched to the same actual object.

In operations S05 to S07, two targets in adjacent frames are selected, and it is compared whether the directions of arrival of the two targets are approximate. In response to the directions of arrival of the two targets being approximate, it is determined that the target information of the two targets match the same actual object. In response to the directions of arrival of the two targets being not approximate, it is determined that the target information of the two targets does not match the same actual object, and two targets in adjacent frames are reselected for comparison of the directions of arrival. The above operations of target selection and direction-of-arrival comparison in the adjacent frames are repeated until all targets in the adjacent frames are matched.

The existing target information matching method performs target information matching based on the comparison result of the directions of arrival of two targets in continuous frames. The signal processing process in the above operations S01 to S04 is digital beam forming (DBF), where an array antenna is used to obtain multi-channel echo signals for digital beam forming to improve the signal-to-noise ratio.

In the digital beam forming, the correlation calculation of the receiving vectors of the plurality of targets includes the vector inner product operation between the receiving vector and the steering vector. Since the steering vector is a function related to the scanning angle of the radar beam, the above signal processing process for obtaining the direction of arrival of the target requires to perform multiple digital beam forming (DBF) operations related to the scanning angle of the radar beam. Assuming that the scanning angle of the digital beam forming ranges from −60 degrees to 60 degrees, with an interval of 1 degree, the calculation of the direction of arrival of each target requires 120 correlation calculations, and the comparison of directions of arrival of two targets requires 240 correlation calculations.

Therefore, the signal processing process in the above conventional target information matching method is relatively complicated, and the correlation calculation takes too long, which deteriorates real-time performance of multi-channel echo signal processing.

Figure 3:
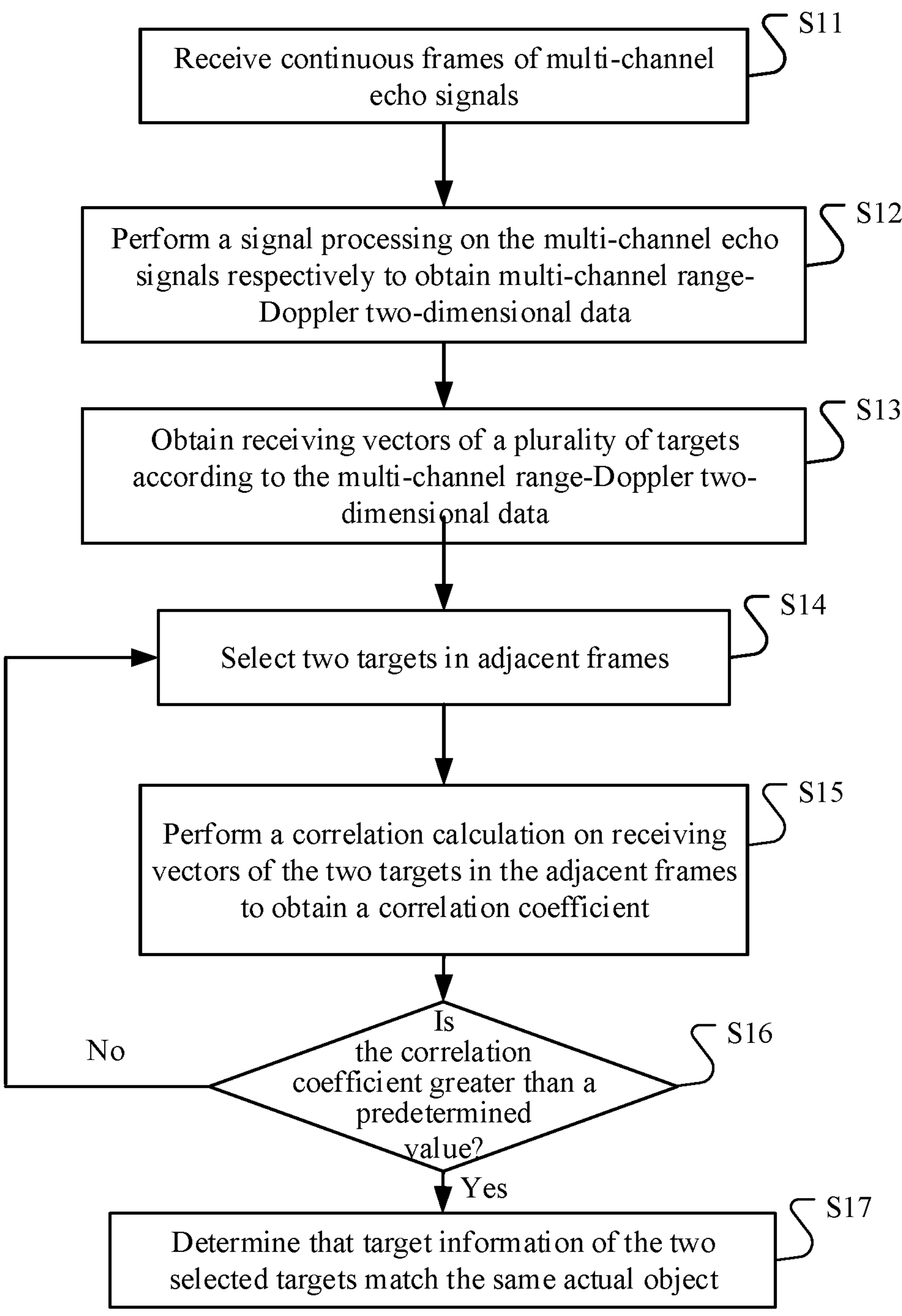
FIG. 3 shows a flowchart of a target information matching method in accordance with at least one embodiment of the present disclosure.

FIG. 3 shows a flowchart of a target information matching method in accordance with some embodiments of the present disclosure. The target matching method performs target information matching based on correlation coefficient results of receiving vectors of two targets in continuous frames. For example, the signal processing unit in the MIMO sensor shown in FIG. 1 may execute the target information matching method described in operations S11 to S17 below.

In S11, continuous frames of multi-channel echo signals are received.

During the frame period of the multi-channel echo signal, the MIMO sensor transmits the radar beam to the surrounding environment via the transmitter antenna Tx, and then receives the echo signal of the radar beam via the receiver antennas Rx1 to Rx4. The receiver unit is connected with a plurality of receiver antennas Rx1 to Rx4 to form a plurality of receiver channels, and performs signal processing on echo signals received by different antennas respectively. In each frame period, the MIMO sensor may receive multi-channel echo signals via the plurality of receiver antennas. In a continuous-frame period, the MIMO sensor may obtain continuous frames of multi-channel echo signals.

In S12, a signal processing is performed on the multi-channel echo signals respectively to obtain multi-channel range-Doppler two-dimensional data.

The signal processing of the echo signal includes an analog signal processing and a digital signal processing. The analog signal processing includes mixing and converting the echo signal to obtain an analog input signal. The digital signal processing includes converting the analog input signal into a digital signal and performing multiple data processing processes: Fourier transformation, target detection, angle detection and point cloud imaging. The Fourier transformation may include one-dimensional Fast Fourier Transformation (1D-FFT) and two-dimensional Fast Fourier Transformation (2D-FFT). The one-dimensional Fast Fourier Transformation (1D-FFT) includes, for example, a range-dimensional Fourier transformation and a velocity-dimensional Fourier transformation, which can obtain range-dimensional data and velocity-dimensional data respectively. The two-dimensional Fast Fourier Transformation (2D-FFT) includes, for example, the range-dimensional Fourier transformation and a Doppler-dimensional Fourier transformation performed successively, through which range-Doppler two-dimensional data can be obtained.

Figure 4:
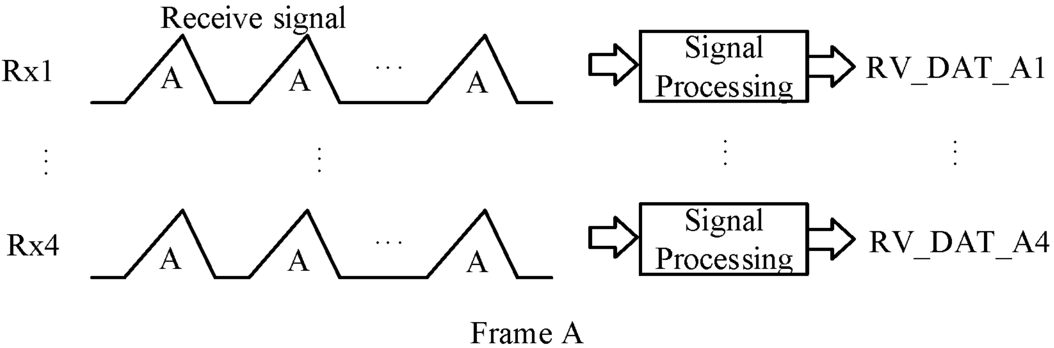
FIG. 4 shows a schematic diagram of a signal processing process for obtaining range-Doppler two-dimensional data in the target information matching method shown in FIG. 3.
Figure 4:
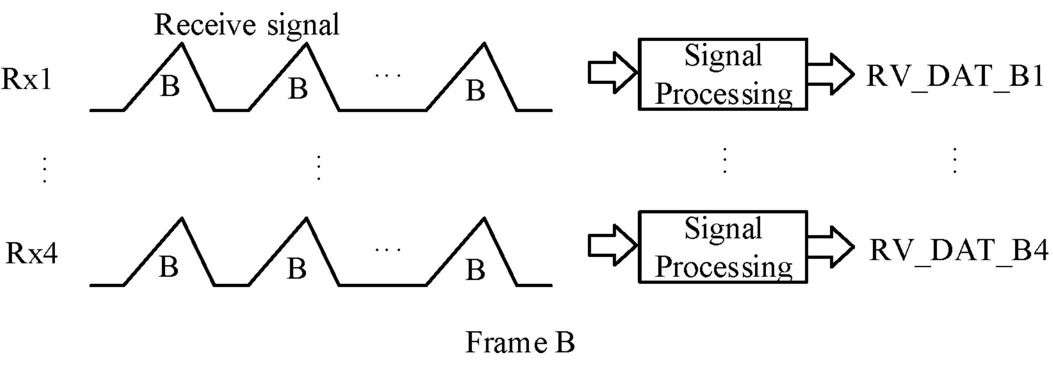

Referring to FIG. 4, adjacent frames of the echo signal of the MIMO sensor may include a first frame A (see frame A shown in FIG. 4) and a second frame B (see frame B shown in FIG. 4), and each frame includes echo signals of four receiver channels. The signal processing process of the above operations is performed on the echo signals of the four receiver channels of the first frame A respectively, and four-channel range-Doppler two-dimensional data RV_DAT_A1 to RV_DAT_A4 may be obtained. The signal processing process of the above operations is performed on the echo signals of the four receiver channels of the second frame B respectively, and four-channel range-Doppler two-dimensional data RV_DAT_B1 to RV_DAT_B4 may be obtained.

In this operation, the above signal processing is performed on the continuous frames of the multi-channel echo signals of the MIMO sensor, and multi-channel range-Doppler two-dimensional data are obtained for each frame of the echo signals.

In S13, receiving vectors of a plurality of targets are obtained according to the multi-channel range-Doppler two-dimensional data.

In some embodiments, the receiving vectors involved in this operation may include range information and velocity information.

In the range-Doppler two-dimensional data of each channel, a peak is searched in a range-Doppler 2D complex plane to detect the target. The range and velocity information of the target are obtained from the range and velocity coordinates (r, v) of the range-Doppler unit, respectively. Therefore, for example, a plurality of range-Doppler units are detected in the range-Doppler two-dimensional data of each channel, and each range-Doppler unit corresponds to a plurality of channels in a target, and the range-Doppler unit has corresponding target information, that is, the range and velocity information of the target.

Figure 5:
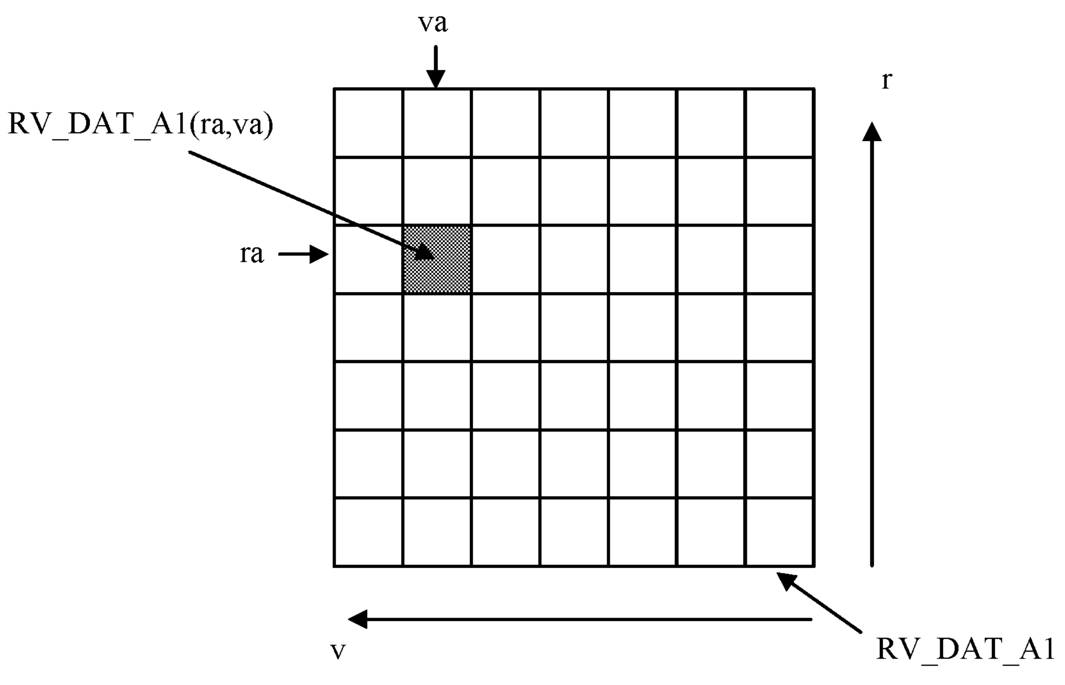
FIG. 5 shows a schematic diagram of coordinates of a range-Doppler unit in the target information matching method shown in FIG. 3.

For example, referring to FIG. 5, the range-Doppler two-dimensional data RV_DAT_A1 of a first channel may be obtained according to the echo signal of the first frame A of the MIMO sensor. A target TA is detected by searching the peak, and the target TA may be expressed as the coordinate RV_DAT_A1(ra, va) of the range-Doppler unit on the range-Doppler two-dimensional complex plane. Herein, ra represents the range of the target TA, and va represents the velocity of the target TA. For the target TA detected in the first frame, the complex number values at the coordinates (ra, va) on the range-Doppler two-dimensional complex plane of the four data channels may be obtained: RV_DAT_A1(ra, va), RV_DAT_A2(ra, va), RV_DAT_A3 (ra, va), and RV_DAT_A4(ra, va).

Similar to FIG. 5, for a target TB detected in the second frame, the complex number values at the coordinates (rb, vb) on the range-Doppler two-dimensional complex plane of the four data channels may be obtained: RV_DAT_B1(rb, vb), RV_DAT_B2 (rb, vb), RV_DAT_B3 (rb, vb), and RV_DAT_B4 (rb, vb). Herein, the target TA detected in the first frame and the target TB detected in the second frame are the same or different targets detected in continuous frames of the multi-channel echo signal.

The range-Doppler units in the multi-channel range-Doppler two-dimensional data form the receiving vector of the same target according to the corresponding relationship with the same target.

Based on the multi-channel range-Doppler two-dimensional data of the first frame, the receiving vector RV_VEC_A of the first target TA in the first frame is obtained, as shown in formula (2):

$$RV\_VEC\_A=[RV\_DAT\_A1(ra,va),RV\_DAT\_A2(ra,va),RV\_DAT\_A3(ra,va),RV\_DAT\_A4(ra,va)] \tag{2}$$

where RV_DAT_A1(ra, va), RV_DAT_A2(ra, va), RV_DAT_A3(ra, va), and RV_DAT_A4(ra, va) are a set of elements of the receiving vector, which respectively represent the complex number values of the target TA at the coordinates (ra, va) on the range-Doppler two-dimensional complex plane of the multi-channel range-Doppler data.

Based on the multi-channel range-Doppler two-dimensional data of the second frame, the receiving vector RV_VEC_B of the second target TB in the second frame is obtained, as shown in formula (3):

$$RV\_VEC\_B=[RV\_DAT\_B1(rb,vb),RV\_DAT\_B2(rb,vb),RV\_DAT\_B3(rb,vb),RV\_DAT\_B4(rb,vb)] \tag{3}$$

where RV_DAT_B1(rb, vb), RV_DAT_B2(rb, vb), RV_DAT_B3(rb, vb) and RV_DAT_B4(rb, vb) are a set of elements of the receiving vector, which respectively represent the complex number values of the target TB at the coordinates (rb, vb) on the range-Doppler two-dimensional complex plane of the multi-channel range-Doppler data.

For the plurality of targets detected in the first frame and the second frame, corresponding receiving vectors are respectively calculated based on the multi-channel range-Doppler two-dimensional data.

In S14, two targets in adjacent frames are selected.

In S15, a correlation calculation is performed on receiving vectors of the two targets in the adjacent frames to obtain a correlation coefficient. A value of the correlation coefficient is positively correlated with the direction-of-arrival approximation degree between the two targets.

In some embodiments, calculating the correlation coefficient of the receiving vectors of the two targets may include: performing a conjugate correlation processing on the receiving vectors of the two targets to obtain the correlation coefficient; where the value of the correlation coefficient is positively correlated with the direction-of-arrival approximation degree between the two targets.

In S16, it is determined whether the correlation coefficient is greater than a predetermined value. In response to the correlation coefficient being greater than the predetermined value, S17 is executed to determine that the two selected targets match the same actual object. In response to the correlation coefficient being less than or equal to the predetermined value, it is determined that the two selected targets do not match the same actual object, and the process returns to S14 to continue executing operations S14 to S16.

In the above operations S14 to S17, for example, for the first target TA selected in the first frame, an arbitrary second target TB is selected in the second frame. A plurality of targets in the second frame are traversed and compared to obtain two objects matching the same actual object in adjacent frames.

Different from the comparison of the directions of arrival of two targets in the conventional target information matching method shown in FIG. 2, the target matching method of the embodiments of the present disclosure performs target information matching based on the correlation coefficient of the receiving vectors of two targets in continuous frames.

In this embodiment, the correlation coefficient corr_coe of the first target TA and the second target TB is shown in formula (4):

$$corr\_coe=|RV\_VEC\_A*(RV\_VEC\_B)H|/(|RV\_VEC\_A|*|RV\_VEC\_B|) \tag{4}$$

where RV_VEC_A represents the receiving vector of the first target TA, RV_VEC_B represents the receiving vector of the second target TB, H represents conjugate and transpose, / represents division, and || represents calculating vector modulus.

In some embodiments, the formula for calculating the vector modulus of the receiving vector RV_VEC_A of the first target TA may be as shown in formula (5):

$$|RV\_VEC\_A|=[RV\_VEC\_A*(RV\_VEC\_A)H]^{1/2} \quad (5)$$

where RV_VEC_A represents the receiving vector of the first target TA, and H represents conjugate and transpose.

Alternatively, a windowing operation may also be performed on the receiving vector first to suppress the side lobe of a DBF spectrum, and then the above DOA matching operation (for example, conjugate processing) may be performed.

For example, a weighting operation may be performed on the receiving vector RV_VEC_A of the first target TA and the receiving vector RV_VEC_B of the second target TB, that is, all elements of the receiving vector RV_VEC_A of the first target TA and the receiving vector RV_VEC_B of the second target TB are multiplied by a complex number value (the complex number value may be calculated or set in advance according to actual demand or big data analysis), and then the above DOA matching may be performed to improve the accuracy of target matching and reduce the amount of calculation.

In the target information matching method according to the embodiments of the present disclosure, target information matching is performed based on the comparison result of the correlation coefficient of two targets in continuous frames and a reference value. The correlation coefficient is directly calculated according to the receiving vectors of the two targets in the continuous frames, and the matching degree of directions of arrival of the two targets is evaluated according to the magnitude of the correlation coefficient. The value of the correlation coefficient is positively correlated with the direction-of-arrival approximation degree between the first target and the second target, that is, the larger the correlation coefficient, the higher the matching degree of the direction of arrival.

Alternatively, in the above embodiments, for the scenario of DOA information matching, a coefficient threshold may also be set for the correlation coefficient based on big data analysis and other operations. That is, in response to the obtained correlation coefficient being greater than or equal to the coefficient threshold, it may be considered that the two targets match in DOA dimension, and in response to the obtained correlation coefficient being less than the coefficient threshold, it may be considered that the two targets do not correspond to the same object (target).

The above target information matching method does not require the actual calculation of the direction of arrival of the target, thus simplifying the complex calculation process of digital beam forming. In particular, since there is no need to perform a vector inner product operation between the receiving vector and the steering vector, multiple digital beam forming (DBF) operations related to the scanning angle of the radar beam can be significantly reduced. Assuming that the scanning angle of the digital beam forming ranges from −60 degrees to 60 degrees, with an interval of 1 degree, the correlation coefficient calculation of the receiving vectors of two targets only requires 1 correlation calculation, which can further significantly improve the timeliness of signal data processing, while the conventional target information matching technology requires 240 correlation operations.

Therefore, the signal processing process of the target information matching method according to the embodiments of the present disclosure simplifies the complexity of correlation calculation, significantly shortens the time consumption, and can significantly improve the real-time performance of multi-channel echo signal processing. Especially, when the PRF of two adjacent frames is set differently to measure the velocity of a high-velocity target, since there is no need to obtain the accurate DOA value of the target, the DOA information of the targets in two frames may be matched without complicated operations like DBF in the target matching process, thus enabling further improvement of the timeliness.

In the above embodiments, the target information matching method is described. In the target information matching method, the target information matching is performed based on the comparison result between the correlation coefficient of two targets in the continuous frames and the reference value, where the two targets are the same or different targets detected in the continuous frames of the multi-channel echo signals, so that the object may be tracked in the continuous frames. The target information matching method is based on the method for determining the direction-of-arrival approximation degree. In response to the directions of arrival of the two targets being approximate, it is determined that the two targets correspond to the same actual object, so that objects may be distinguished in continuous frames.

In an alternative embodiment, the correlation coefficient of two targets in the same frame may be obtained by using the same signal processing method. The direction-of-arrival approximation degree of the two targets may be determined based on the comparison result of the correlation coefficient of the two targets in the same frame and the reference value, so that objects may be distinguished in the same frame. In other words, the two targets mentioned in the above operations may also be different targets detected in the same frame of multi-channel echo signals.

It should be noted that in this document, the terms "include", "contain" or any other variant thereof are intended to cover a non-exclusive inclusion, so that a process, method, article, or device that includes a list of elements includes not only those elements, but also other elements not explicitly listed or inherent to such process, method, article, or device. Without further limitation, the element defined by the statement "includes a . . . " does not exclude the presence of another identical element in the process, method, article or device that includes the element.

In accordance with the embodiments of the present disclosure as described above, these embodiments are not an exhaustive recitation of all details, nor is it limited that the present disclosure is only the specific embodiments described. It is obvious that many modifications and variations may be made based on the above description. These embodiments are selected and specifically described in this specification in order to better explain the principle and practical application of the present disclosure, so that those skilled in the art may make good use of the present disclosure and its modifications based on the present disclosure. The present disclosure is to be defined by the claims, along with their full scope and equivalents.

What is claimed is:

1. A method for detecting target information at a Multiple Input Multiple Output (MIMO) sensor, comprising:

receiving multi-channel echo signals via a plurality of transceiver channels of the MIMO sensor, wherein the multi-channel echo signals include successive frames;

processing, by a processor of the MIMO sensor, the multi-channel echo signals to obtain receiving vectors of a first target and a second target respectively, wherein the processor is coupled to the plurality of transceiver channels;

calculating, by the processor, a correlation coefficient between the receiving vectors of the first target and the second target; and determining, by the processor, a direction-of-arrival approximation degree between the first target and the second target according to the correlation coefficient;

determining, by the processor, that the first target and the second target match the same actual object in response to the correlation coefficient being greater than a predetermined value; and determining, by the processor, that the first target and the second target do not match the same actual object in response to the correlation coefficient being less than or equal to the predetermined value, and performing traversal on a plurality of targets detected in the successive frames to obtain two targets that match the same actual object.

2. The method of claim 1, wherein the receiving vectors comprise range information and velocity information.

3. The method of claim 1, wherein calculating the correlation coefficient between the receiving vectors of the first target and the second target comprises:

performing a conjugate correlation processing on the receiving vectors of the first target and the second target to obtain the correlation coefficient;

wherein a value of the correlation coefficient is positively correlated with the direction-of-arrival approximation degree between the first target and the second target.

4. The method of claim 1, wherein the first target and the second target are different targets detected in a same frame of the multi-channel echo signals; or the first target and the second target are same or different targets detected in the successive frames of the multi-channel echo signals.

5. The method of claim 1, wherein the first target and the second target are detected from adjacent frames of the successive frames, the adjacent frames comprise a first frame and a second frame, and the first target and the second target are targets detected in the first frame and the second frame, respectively;

wherein the method further comprises:

processing the multi-channel echo signals of the adjacent frames respectively to obtain multi-channel range-Doppler two-dimensional data of the first frame and the second frame;

detecting the first target by searching for a peak in the multi-channel range-Doppler two-dimensional data of the first frame; and detecting the second target by searching for a peak in the multi-channel range-Doppler two-dimensional data of the second frame.

6. The method of claim 5, wherein the first target corresponds to a first set of range-Doppler units in the multi-channel range-Doppler two-dimensional data of the first frame, and the second target corresponds to a second set of range-Doppler units in the multi-channel range-Doppler two-dimensional data of the second frame, a coordinate parameter of each unit in the first set of range-Doppler units and the second set of range-Doppler units in corresponding range-Doppler two-dimensional data comprises range information and velocity information.

7. The method of claim 6, wherein the receiving vector of the first target comprises a first set of elements, the first set of elements respectively representing complex number values of the first set of range-Doppler units at corresponding coordinates on a range-Doppler two-dimensional complex plane, and the receiving vector of the second target comprises a second set of elements, the second set of elements respectively representing complex number values of the second set of range-Doppler units at corresponding coordinates on the range-Doppler two-dimensional complex plane.

8. The method of claim 1, further comprising:

determining whether the first target and the second target match a same actual object according to the direction of arrival approximation degree.

9. A MIMO sensor, comprising:

a plurality of transceiver channels, configured to receive multi-channel echo signals, wherein the multi-channel echo signals include successive frames; and a processor coupled to the plurality of transceiver channels and configured to:

process the multi-channel echo signals to obtain receiving vectors of a first target and a second target respectively;

calculate a correlation coefficient between the receiving vectors of the first target and the second targe; and determine a direction-of-arrival approximation degree between the first target and the second target according to the correlation coefficient;

determining, by the processor, that the first target and the second target match the same actual object in response to the correlation coefficient being greater than a predetermined value; and determining, by the processor, that the first target and the second target do not match the same actual object in response to the correlation coefficient being less than or equal to the predetermined value, and performing traversal on a plurality of targets detected in the successive frames to obtain two targets that match the same actual object;

wherein the receiving vectors are obtained from multi-channel range-Doppler two-dimensional complex data corresponding to the first target and the second target, and the correlation coefficient is calculated by a conjugate correlation processing between the receiving vectors.

10. The MIMO sensor of claim 9, wherein the receiving vectors comprise range information and velocity information.

11. The MIMO sensor of claim 10, wherein calculating the correlation coefficient between the receiving vectors of the first target and the second target comprises:

performing a conjugate correlation processing on the receiving vectors of the first target and the second target to obtain the correlation coefficient;

wherein a value of the correlation coefficient is positively correlated with the direction-of-arrival approximation degree between the first target and the second target.

12. The MIMO sensor of claim 9, wherein the plurality of transceiver channels comprise:

a plurality of antennas comprising a combination of at least one transmitter antenna and a plurality of receiver antennas, or a combination of a plurality of transmitter antennas and at least one receiver antenna;

a transmitter unit connected with the at least one transmitter antenna or the plurality of transmitter antennas among the plurality of antennas to provide at least one transmitter channel; and a receiver unit connected with the at least one receiver antenna or the plurality of receiver antennas among the plurality of antennas to provide at least one receiver channel, wherein a total number of the at least one transmitter channel and the at least one receiver channel is greater than or equal to 3.

13. The MIMO sensor of claim 12, the processor is further configured to:

control the transmitter unit to generate a transmitting signal to be converted into a radar beam via the at least one transmitter antenna or the plurality of transmitter antennas among the plurality of antennas, and to control the receiver unit to obtain multi-channel echo signals via the at least one receiver antenna or the plurality of receiver antennas among the plurality of antennas.

14. The MIMO sensor of claim 9, wherein the first target and the second target are same or different targets detected in continuous frames of the multi-channel echo signals.

15. The MIMO sensor of claim 14, wherein the processor is further configured to obtain the receiving vectors of the first target and the second target respectively in adjacent frames of the continuous frames.

16. The MIMO sensor of claim 14, wherein the processor is further configured to determine whether the first target and the second target match a same actual object according to the correlation coefficient.

17. A method for target information matching at a Multiple Input Multiple Output (MIMO) sensor, comprising:

receiving multi-channel echo signals via a plurality of transceiver channels of the MIMO sensor;

processing, by a processor of the MIMO sensor, the multi-channel echo signals to obtain receiving vectors of a first target and a second target respectively, wherein the processor is coupled to the plurality of transceiver channels;

calculating, by the processor, a correlation coefficient between the receiving vectors of the first target and the second target;

determining, by the processor, a direction-of-arrival approximation degree between the first target and the second target according to the correlation coefficient;

wherein the multi-channel echo signals include successive frames and the first target and the second target are detected from adjacent frames of the successive frames, and the method further comprises:

determining, by the processor, whether the first target and the second target match a same actual object based on the correlation coefficient;

determining, by the processor, that the first target and the second target match the same actual object in response to the correlation coefficient being greater than a predetermined value; and determining, by the processor, that the first target and the second target do not match the same actual object in response to the correlation coefficient being less than or equal to the predetermined value, and performing traversal on a plurality of targets detected in the successive frames to obtain two targets that match the same actual object.

* * * * *